(12) United States Patent
Yano et al.

(10) Patent No.: US 6,409,780 B1
(45) Date of Patent: Jun. 25, 2002

(54) WATER-LADEN SOLID MATTER OF VAPOR-PHASE PROCESSED INORGANIC OXIDE PARTICLES AND SLURRY FOR POLISHING AND MANUFACTURING METHOD OF SEMICONDUCTOR DEVICES

(75) Inventors: Hiroyuki Yano, Yokohama; Nobuo Hayasaka, Yokosuka; Katsuya Okumura, Yokohama; Akira Iio, Yokkaichi; Masayuki Hattori, Ama-gun; Kiyonobu Kubota, Yokkaichi, all of (JP)

(73) Assignees: Kabushiki Kaisha Toshiba, Kawasaki; JSR Corporation, Tokyo, both of (JP)

( * ) Notice: Subject to any disclaimer, the term of this patent is extended or adjusted under 35 U.S.C. 154(b) by 0 days.

(21) Appl. No.: 09/482,937

(22) Filed: Jan. 14, 2000

(30) Foreign Application Priority Data

Jan. 18, 1999 (JP) .......................... 11-009885

(51) Int. Cl.⁷ .................... C09K 3/14; C09G 1/02; C01B 6/00
(52) U.S. Cl. .................. 51/307; 51/308; 51/309; 106/3; 423/592; 423/644
(58) Field of Search .................. 51/307, 308, 309; 106/3; 423/644, 646, 647, 592

(56) References Cited

U.S. PATENT DOCUMENTS

| | | | | |
|---|---|---|---|---|
| 3,170,273 A | * | 2/1965 | Walsh et al. | 51/308 |
| 3,552,071 A | * | 1/1971 | Albanese et al. | 51/309 |
| 3,715,842 A | * | 2/1973 | Tredinnick et al. | 51/308 |
| 3,867,156 A | * | 2/1975 | Fukumoto et al. | 106/483 |
| 3,874,129 A | * | 4/1975 | Deckert et al. | 51/308 |
| 4,011,099 A | * | 3/1977 | Gutsche | 51/308 |
| 4,042,361 A | | 8/1977 | Bihuniak et al. | |
| 4,462,188 A | * | 7/1984 | Payne | 51/308 |
| 4,561,978 A | * | 12/1985 | Janecek | 210/401 |
| 4,956,015 A | * | 9/1990 | Okajima et al. | 51/309 |
| 5,015,264 A | * | 5/1991 | Story et al. | 106/436 |
| 5,116,535 A | | 5/1992 | Cochrane | |
| 5,480,626 A | | 1/1996 | Klasen et al. | |
| 5,527,423 A | * | 6/1996 | Neville et al. | 51/308 |
| 5,575,837 A | * | 11/1996 | Kodama et al. | 51/307 |
| 5,693,239 A | * | 12/1997 | Wang et al. | 51/309 |

FOREIGN PATENT DOCUMENTS

| | | |
|---|---|---|
| EP | 0 708 160 A2 | 4/1996 |
| EP | 0 786 504 A2 | 7/1997 |
| GB | 2 229 432 A | 9/1990 |

OTHER PUBLICATIONS

Database WPI, Section Ch, Week 199249, Derwent Publications Ltd., London, GB; Class E16, AN 1992–405814, XP002174362 & SU 1 701 759 A (Univ Chemovtsy), Dec. 30, 1991 (Dec. 30, 1991) (English Abstract).

* cited by examiner

Primary Examiner—Michael Marcheschi
(74) Attorney, Agent, or Firm—Oblon, Spivak, McClelland, Maier & Neustadt, P.C.

(57) ABSTRACT

Water-laden solid matter is provided which is obtained by adding 40 to 300 weight parts of water to 100 weight parts of inorganic oxide particles synthesized by fumed process or metal evaporation oxidation process, slurry for polishing is provided which is manufactured by using the water-laden solid matter, and a method for manufacturing a semiconductor device using the above slurry. Said water-laden solid matter is within a range of 0.3 to 3 g/cm³ in bulk density and within a range of 0.5 to 100 mmφ in average particle size when manufactured granular. Said slurry for polishing is manufactured from the water-laden solid matter, and the average particle size thereof after being dispersed in water is within a range of 0.05 to 1.0 μm.

5 Claims, 4 Drawing Sheets

(a)

(b)

(a)

(b)

(a)

(b)

(a)

(b)

(c)

WATER-LADEN SOLID MATTER OF VAPOR-PHASE PROCESSED INORGANIC OXIDE PARTICLES AND SLURRY FOR POLISHING AND MANUFACTURING METHOD OF SEMICONDUCTOR DEVICES

FIELD OF THE INVENTION

The present invention relates to water-laden solid matter of inorganic oxide particles which are synthesized by vapor phase process (hereinafter referred to as "vapor-phase processed inorganic oxide particles"), slurry for polishing which is manufactured from such water-laden solid matter and used for the manufacture of semiconductor devices such as VLSI, and manufacturing method for manufacturing semiconductor devices using the slurry. The water-laden solid matter according to the present invention is so high in bulk density as to be easy in storage, transport, etc. The slurry for polishing according to the present invention is so high in stability as to be free from problems such as increase in viscosity, gelation and separation and precipitation during storage.

BACKGROUND OF THE INVENTION

Recently, slurry which is obtained by dispersing the vapor-phase processed inorganic oxide particles in the water has been used for polishing semiconductor devices such as VLSI. Here, the "vapor-phase processed inorganic oxide particles" refers in case of silica, for example, to inorganic oxide particles which are synthesized by fumed process for synthesizing silica by allowing silicon tetrachloride to react with hydrogen and oxygen and then hydrolyzed (high-temperature flame hydrolysis process) or by vapor phase process such as Nano-phase Technology's process for synthesizing inorganic oxides particles by heating a metal to a temperature above the melting point of such metal to produce metal steam and allowing such metal steam to react with oxygen (metal evaporation and oxidation process).

The vapor-phase processed inorganic oxide particles, which are raw materials of the slurry for polishing semiconductor devices, are so fine in particle size as to be low in bulk density. For example, the bulk density of silica synthesized by the fumed process is approx. 0.05 g/cm$^3$, and the bulk density of alumina synthesized by the fumed process is approx. 0.05 g/cm$^3$, and the bulk density of silica synthesized by the Nano-phase Technology's process is approx. 0.05 g/cm$^3$.

As described above, the vapor-phase processed inorganic oxide particles is so low in bulk density as to be bulky occupying a large space for storage and transport, hard to handle and high in cost. For this reason, it has been desired to increase the bulk density of the vapor-phase processed inorganic oxide particles.

For increasing the bulk density of the vapor-phase processed inorganic oxide particles, there is a method of releasing air from the vapor-phase processed inorganic oxide particles. However, this method can increase the bulk density only up to 0.2 g/cm$^3$.

For this reason, it has been examined to store or transport the vapor-phase processed inorganic oxide particles in the state dispersed in water or any other liquid. However, there is a problem with this method that the aqueous dispersed matter of the vapor-phase processed inorganic oxide particles is unstable with extremely quick flocculation. For the stable storage of the aqueous dispersed matter of the vapor-phase processed inorganic oxide particles, it may be possible to adjust the pH of the aqueous dispersed matter or add some dispersant. However, if these methods are used, the aqueous dispersed matter of the vapor-phase processed inorganic oxide particles may be limited in use after the adjustment of the pH or the addition of some dispersant.

Equipment for manufacturing the slurry for polishing semiconductor devices may be installed within clean rooms or clean booths to avoid the mixture of dirt or the like. However, this cause a problem that the vapor-phase processed inorganic oxide particles, which are raw materials of the slurry for polishing, are so fine as to easily float in the air in the state of dust and lower the degree of cleanliness of the clean rooms or clean booths. To solve this problem, it has been desired to take measures so that the vapor-phase processed inorganic oxide particles cannot float in the air in the state of dust.

SUMMARY OF THE INVENTION

An object of the present invention is to increase the bulk density of the vapor-phase processed inorganic oxide particles, which are raw materials of the slurry for polishing, to make the vapor-phase processed inorganic oxide particles to be suitable to storage and transport. Another object of the present invention is to take measures so that the vapor-phase processed inorganic oxide particles cannot float in the air in the state of dust. Still another object of the present invention is to manufacture highly stable slurry for polishing semiconductor devices by using the vapor-phase processed inorganic oxide particles which are suitable to storage and transport and have been so arranged as not to float in the air in the state of dust. And still another object of the present invention is to provide manufacturing method for manufacturing semiconductor devices using the above slurry.

The inventors of the current invention earnestly examined these problems for solution, and as result, found that by adding a specific quantity of water thereto, the vapor-phase processed inorganic oxide particles could be increased in bulk density, could be stably stored for a long time, and could be substantially reduced in the production of dust, which led to the present invention.

The water-laden solid matter according to the present invention is characterized by being obtained by adding 40 to 300 weight parts of the water to 100 weight parts of the inorganic oxide particles synthesized by vapor phase process.

The water-laden solid matter according to the present invention is water-laden solid matter which is characterized by being obtained by adding 40 to 300 weight parts of the water to 100 weight parts of the inorganic oxide particles synthesized by either the fumed process (high-temperature flame hydrolysis process) or the Nano-phase Technology's process (metal evaporation and oxidation process).

The water-laden solid matter according to the present invention is characterized by being obtained by adding 40 to 300 weight parts of the water to 100 weight parts of the inorganic oxide particles synthesized by either the fumed process or the vapor phase process such as the Nano-phase Technology's process and granular matter within a range of 0.3 to 3 g/cm$^3$ in bulk density and within a range of 0.5 to 100 mm$\phi$ in average particle size. Here, and hereinafter, $\phi$ denotes average particle size diameter.

Also, the slurry for polishing according to the present invention is characterized by being obtained by dispersing the water-laden solid matter prescribed by any of the above methods in the water so that the average size of the dispersed particles can be within a range of 0.05 to 1.0 $\mu$m.

Also, the manufacturing method according to the present invention is characterized by manufacturing semiconductor devices using the above slurry for polishing. Here, the semiconductor devices refers to, for example, polished wafers, various devices having or equipped with the above wafers, and various devices manufactured of the above wafers (in other words, various devices being mounted on the above wafers), and the like.

DETAILED DESCRIPTION OF THE INVENTION

The vapor-phase processed inorganic oxide particles used in the present invention are synthesized by the fumed process (high-temperature flame hydrolysis process) or the vapor phase process such as the Nano-phase Technology's process (metal evaporation and oxidation process), and high in purity. The inorganic oxide particles synthesized by the fumed process are high in purity and comparatively inexpensive, and therefore preferable.

Among the vapor-phase processed inorganic oxides used in the present invention are metal oxides such as silicon oxide, aluminum oxide, titanic oxide, zirconium oxide, antimony oxide, chromium oxide, germanium oxide, vanadium oxide, tungsten oxide, iron oxide, cerium oxide, manganese oxide and zinc oxide. Of these metal oxides, silicon oxide, aluminum oxide, titanic oxide and cerium oxide are preferable.

Manufacturing Method of Water-laden Solid Matter

Any method may be used for obtaining the water-laden solid matter according to the present invention by adding 40 to 300 weight parts of water to 100 weight parts of any of the above vapor-phase processed inorganic oxide particles.

For example, the water-laden solid matter according to the present invention can be obtained by weakly mixing the vapor-phased inorganic oxide particles in a mixing bath equipped with a mixer while adding water little by little. If the mixing motion is too strong, the water-laden solid matter of the vapor-phased inorganic oxides become slurried, which is not preferable. For this reason, when obtaining the water-laden solid matter by the mixing, it is necessary to pay attention to the strength of the mixing not to be too strong.

Among the granulators of mixing type for obtaining the water-laden solid matter by mixing are Flow Jet Granulator manufactured by Okawara Seisakusho Co., Ltd. and High-speed Mixing Type Mixers/Granulators Models NMG-P, NMG-H and NMG-L manufactured by Nara Machinery Co., Ltd.

Among the methods of manufacturing the water-laden solid matter according to the present invention without using any mixer are a method using a rolling granulator and a method using a planetary granulator.

Figure 4:
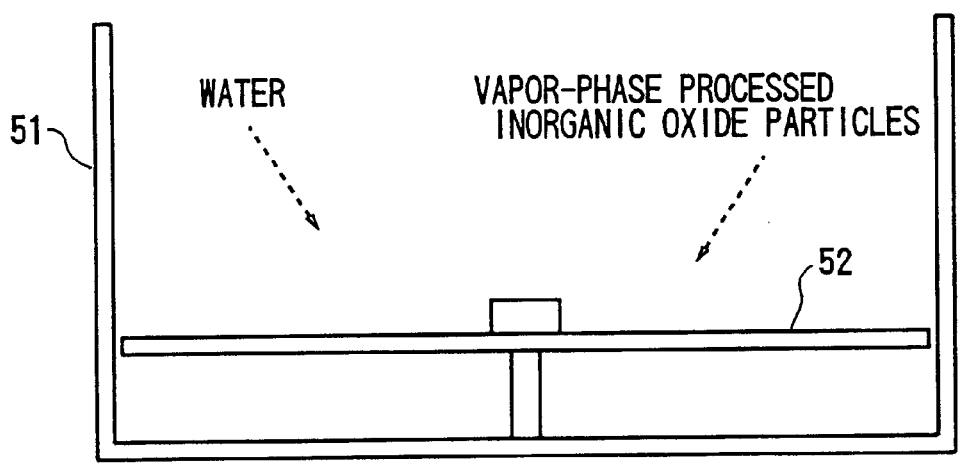
FIG. 4(a) is a schematic cross-sectional view of a rolling granulator viewed from the front.
FIG. 4(b) is a descriptive view illustrating force applied to particles on a rotary disk at the inner bottom of the rolling granulator.
FIG. 4(c) is a descriptive view illustrating the status of rolling of particles on the rotary disk.
Figure 4:
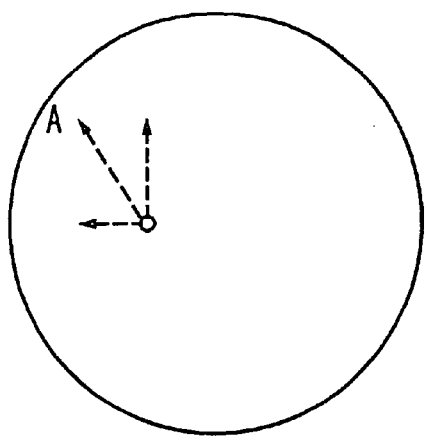
Figure 4:
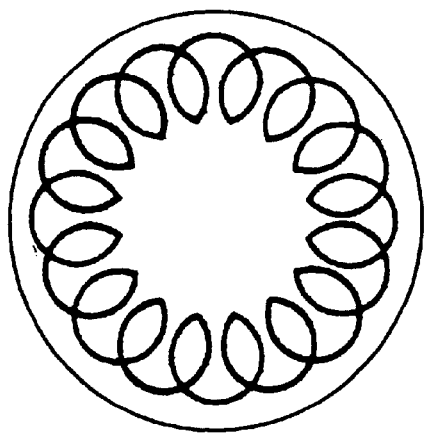

The construction of the rolling granulator is schematically illustrated in FIG. 4(a). The rolling granulator has a rotary disk 52 at the inner bottom of a cylinder 51. This granulator granulates the vapor-phase processed inorganic oxide particles by supplying the vapor-phase processed inorganic oxide particles onto the rotary disk 52 while supplying water in spray or in any other form. The angle, rotational speed and depth of the rotary disk 52 are properly set, grooves are made in the top of the rotary disk 52, if necessary, and the depth, shape, direction, interval, etc. of such grooves are properly fixed. By such proper arrangement, the particles of the vapor-phase processed inorganic oxides can become uniform in size. FIG. 4(b) illustrates forces applied to each particle on the rotary disk 52, and FIG. 4(c) illustrates the rolling status of a specific particle. To the vapor-phase processed inorganic oxide particles which are granulated into particles of irregular sizes by being supplied onto the rotary disk 52 and supplied with water in spray are applied forces in the rotational (tangent) direction of the rotary disk 52 and forces in the centrifugal (radial) direction. By being applied these forces, the vapor-phase processed oxide particles of irregular size repeat motions of being thrown in the direction of resultant force A, bumped against the inside wall of the cylinder 51, thrown to the inner direction, and bumped against the inside wall of the cylinder 51 again. That is, due to the rotation of each particle and the revolution of all particles in unity, the vapor-phase processed inorganic oxide particles repeat eddy motions like the twisting of a rope. During these motions, the vapor-phase processed oxide particles are bumped against the grooves in the revolving disk 52, thereby shocked and sheared, and gradually shaped spherical. In this way, the granular matter comparatively uniform in particle size can be obtained.

Among the rolling granulators are Marumerizer manufactured by Fuji Paudal Co., Ltd. and Kurimoto Pan Type Granulator manufactured by Kurimoto Iron Works Co., Ltd. The rolling granulator is available in 2 types: a type for continuously obtaining the granular matter, and a type for obtaining the granular matter in batch.

A fluidized bed type granulator continuously supplies the vapor-phase processed inorganic oxide particles onto a fluidized bed formed by air blow, have them come in contact with atomized minute particles of water and thereby condense and granulate the vapor-phase processed inorganic oxide particles. Among the fluidized bed type granulators is Mixgrade manufactured by Okawara Seisakusho Co., Ltd. The dry process of this granulator is not used.

These equipment should preferably be provided with a lining or coating of polyurethane, Teflon, epoxy resin or the like or a ceramics lining of zirconia or the like on the liquid and particle contacting portions to minimize metal contamination, if necessary.

Each of the above granulators can be used for obtaining granular matter as the water-laden solid matter according to the present invention. However,the water-laden solid matter according to the present invention should not be limited to being granular but may be shaped, for example, in plate or in lump.

When the water-laden solid matter according to the present invention is granular, the average particle size thereof should be within a range of 0.5 to 100 mm$\phi$, preferably be within a range of 1 to 30 mm$\phi$, more preferably be within a range of 2 to 20 mm$\phi$. If the particle size is smaller than 0.5 mmφ, there is a problem that the fluidity of the particles is so low that the handling of the particles for measurement or transfer is difficult. On the other hand, if the particle size is larger than 100 mmφ, there is a problem that the particles are quickly cracked during the handling thereof, the particles do not fluidized, and the handling of the particles for measurement or transfer is difficult.

When the water-laden solid matter according to the present invention is made granular, the bulk density thereof should preferably be within a range of 0.3 to 3 g/cm$^3$, more preferably be within a range of 0.4 to 2 g/cm$^3$, and particularly preferably be within a range of 0.4 to 1.5 g/cm$^3$. If the bulk density is lower than 0.3 g/cm$^{31}$, there is a problem that fine particles are easily produced. On the other hand, if the bulk density is higher than 3 g/cm$^3$, there is a problem that the particles are hard to be fluidized, and the handling of the particles for measurement or transfer is difficult.

As the water for use in manufacturing the water-laden solid matter according to the present invention, ion-exchanged water or the like having a required purity may be used. The quantity of this water depends on the type of the vapor-phase processed inorganic oxide particles, the average particle size of the primary particles thereof, specific surface area, etc. However, the quantity of this water against 100 weight parts of the vapor-phased inorganic oxide particles should be within a range of 40 to 300 weight parts, preferable be within a range of 50 to 200 weight parts, and more preferably be within a range of 60 to 150 weight parts. If the average particle size of the vapor-phase processed inorganic oxide particles, which are the raw materials of the water-laden solid matter according to the present invention, is so small that the specific surface area thereof is large, the quantity of the water should be increased. If the quantity of the water is smaller than 40 weight parts, the required water-laden solid matter may not be obtained or even if the water-laden solid matter is obtained, the bulk density thereof may not be increased. Also, if the quantity of the water is smaller than 40 weight parts, a large quantity of dust is produced during the handling of the manufactured matter, which is not preferable. On the other hand, if the quantity of the water exceeds 300 weight parts, the manufactured matter cannot become solid, which is not preferable, either.

If necessary and if there is no problem with any uses after manufacture, the water-laden solid matter according to the present invention may be added with acid or alkali.

Manufacturing Method for the Slurry for Polishing

By mixing the water-laden solid matter according to the present invention with a water-base medium added for the required quantity within a mixing bath of a kneader which is made to rotate by the rotation of sub-spindles made to rotate by a main spindle while mixing blades are made to rotate by the rotation of the sub-spindles, the slurry for polishing according to the present invention can be obtained. Here, the method of making the sub-spindles rotate by the main spindle while the mixing blades are made to rotate by the rotation of the sub-spindles is generally called "planetary method."

Figure 1:
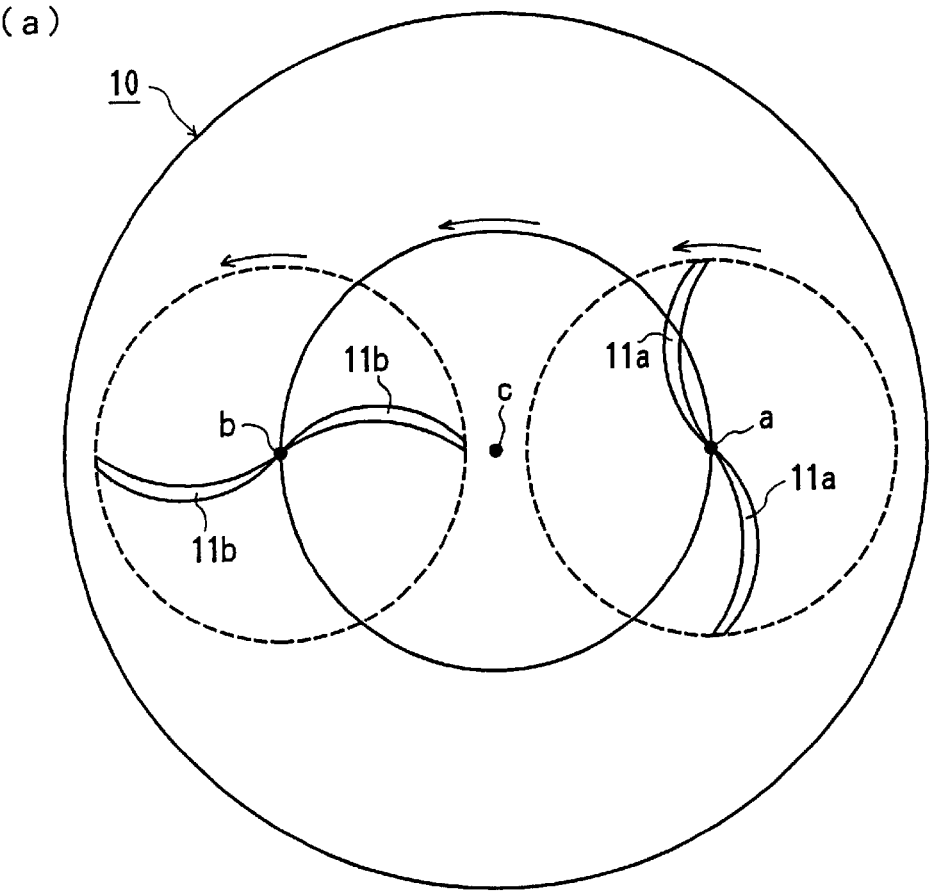
FIG. 1(a) is a top view schematically illustrating the principle of a planetary kneader.
FIG. 1(b) is a side view thereof.
Figure 1:
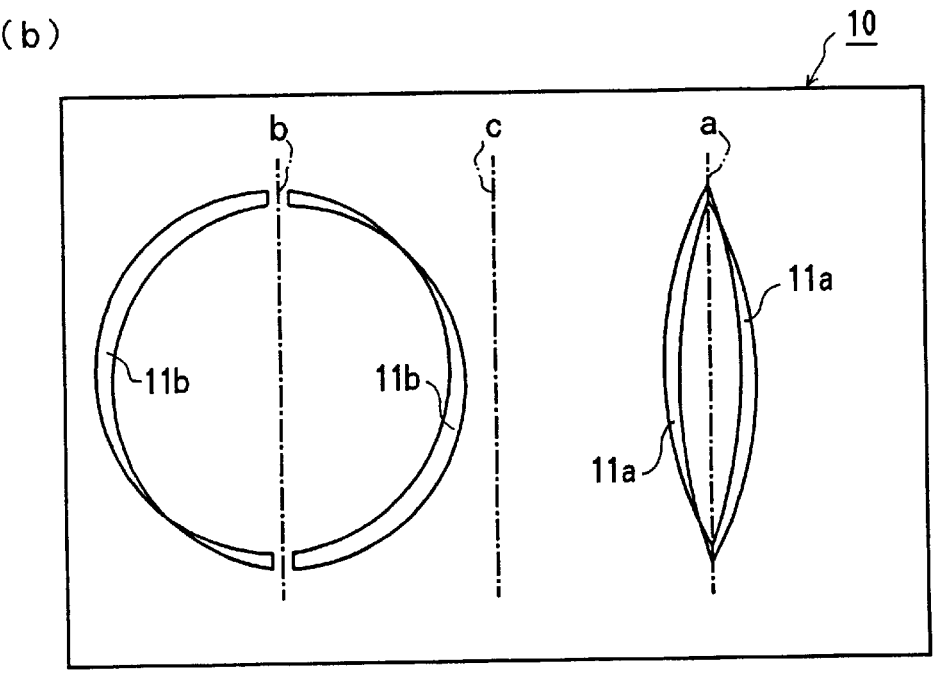

FIG. 1 schematically illustrates the planetary kneader. FIG. 1(a) is a top view thereof, and FIG. 1(b) is a side view thereof. As shown in this figure, provided within a mixing bath 10 of the planetary kneader are mixing blades 11a which rotate around a sub-spindle a in the direction indicated by an arrow, mixing blades 11b which rotate around a sub-spindle b in the direction indicated by an arrow, and a main spindle c which make these two sub-spindles a and b rotate in the direction indicated by an arrow. That is, the planetary kneader is so constructed that each pair of mixing blades rotate on their own axis around the sub-spindle thereof, and at the same time, each sub-spindle revolves around the main spindle.

As the mixing blades 11a and 11b constructed as described above move with complicated loci, the fluid within the mixing bath is uniformly kneaded, flocculated matter is sufficiently divided, and as a result, a large quantity of powder can be efficiently dispersed in a comparatively small quantity of liquid.

FIG. 1 shows a case where two sub-spindles a and b are provided. However, the number of sub-spindles may be 1 or 3 or more. When a plurality of sub-spindles are provided, each sub-spindle may be provided at regular intervals or at irregular intervals.

FIG. 1 shows that two mixing blades are provided in a pair per sub-spindle. However, the number of mixing blades may be 1 or 3 or more in a pair. Furthermore, it may be so arranged that a high-speed rotary blade is provided coaxially or hetero-axially with the sub-spindle of the mixing blades in addition to the mixing blades to improve the efficiency of the division and dispersion of the flocculated matter.

FIG. 1 shows that the main spindle c and the sub-spindles a and b rotate counterclockwise viewed from the above. However, it may be so arranged that the main spindle and the sub-spindles rotate in different directions from each other to change the loci of the mixing blades.

FIG. 1 shows that the mixing blades 11a and 11b is shaped to be curved between both ends thereof and at the same time twisted or wrenched. However, as long as the mixing blades can uniformly knead the fluid within the mixing bath, sufficiently divide the flocculated matter, and as a result efficiently disperse a large quantity of powder in a comparatively small quantity of liquid, the mixing blades may take any other shapes.

Among the planetary kneaders which can satisfy the above requirements are Universal Mixer/Stirrer manufactured by Dalton Co., Ltd., Universal Mixer manufactured by Powlex Co., Ltd., KPM Power Mix manufactured by Kurimoto Iron Works Co., Ltd., Planetary Kneader/Mixer manufactured by Ashizawa Co., Ltd., T. K. Hibis Disperse Mix manufactured by Tokushu Kiko Co., Ltd., and Planetary Disper manufactured by Asada Iron Works Co., Ltd. which can be favorably used. In particular, Planetary Disper and T. K. Hibis Disper Mix, each of which has a combination of mixing blades rotating on their own axes and revolving around the main spindle with a high-speed rotary blade (disper), are favorable for the reason that these kneaders can uniformly disperse a large quantity of powder in a comparatively small quantity of liquid within a short time.

Concentration of the Water-laden solid matter in the Slurry for Polishing during Dispersion The concentration of the water-laden solid matter in the slurry for polishing during dispersion, which is manufactured from the water-laden solid matter according to the present invention, should be within a range of 30 to 70 wt %, preferably be within a range of 35 to 60 wt %, and more preferably be within a range of 40 to 50 wt %. If the concentration of the water-laden solid matter is less than 30 wt %, there would be a large quantity of flocculated matter left over, and this would cause a problem that the flocculated matter would precipitate or separate or the viscosity of the slurry for polishing would increase and gelled. On the other hand, if the concentration of the water-laden solid matter is more than 70 wt %, too much load on the kneader would stop the mixing operation thereof and if the mixing operation is forcedly continued under such large load, excessive dispersion would be caused and coarse particles of more than 10 μm would be produced in a large quantity due to re-flocculation.

Adding Method of the Water-laden Solid Matter During the Manufacture of the Slurry for Polishing When manufacturing the slurry for polishing, it is preferable that the water-laden solid matter should be mixed while it is continuously or intermittently added to the water-base medium. If a necessary quantity of the water-laden solid matter is added at a time in the first place, there would be a problem that the load on the kneader is so large that the kneader would stop. Therefore, it is preferable that the water-laden solid matter is continuously or intermittently added while monitoring the current value of (load on) the kneader so that the load cannot become too much. Among the water-laden solid matter supplying equipment is one which transfers the water-laden solid matter by means of screw.

When the water-laden solid matter according to the present invention is used for the manufacture of the slurry for polishing, it is possible to shorten the time required for adding the water-laden solid matter and substantially improve the operation efficiency of the kneader compared to the use of inorganic oxide particles in the powder state.

Addition of Acid or Alkali to the Slurry

It is preferable to add acid or alkali to the slurry obtained by adding the water-laden solid matter according to the present invention as the stability of the finally obtained slurry for polishing can be improved. When acid is added to the slurry, it is preferable that the pH of the slurry for polishing finally obtained after dilution should be within a range of 7 to 2. When alkali is added to the slurry, it is preferable that the pH of the slurry for polishing finally obtained after dilution should be within a range of 7 to 12. If the pH is smaller than 2 or larger than 12, there would be a problem that the inorganic oxide particles would be melted or the particles would flocculate.

Acid or alkali may be added to the water-laden solid matter according to the present invention with any timing: beforehand, during mixing or after kneading.

Among acids which may be added are inorganic acids such as hydrochloric acid, nitric acid, sulfuric acid and phosphoric acid, and organic acids such as acetic acid, phthalic acid, acrylic acid, methacrylic acid, crotonic acid, polyacrylic acid, maleic acid and sorbic acid. It is preferable to use univalent acids such as hydrochloric acid, nitric acid and sulfuric acid.

Among alkalis which may be added are inorganic bases such as potassium hydroxide, sodium hydroxide, lithium hydroxide and ammonia and amines such as sthylenediamine, triethylamine and piperazine.

Dilution of the Slurry and Others

It is preferable that the slurry obtained by using the water-laden solid matter according to the present invention and the slurry obtained by adding acid or alkali to said slurry should be diluted after the kneading process. The degree of dilution depends on the type of the dispersed inorganic oxide particles or the concentration of the water-laden solid matter during kneading. However, it is preferable to lower the concentration of the water-laden solid matter by about 5 wt % or more from the concentration of the water-laden solid matter during the kneading process by adding a water-base medium. If the concentration of the water-laden solid matter during the kneading process is not lowered, not only it is difficult to handle the slurry due to high viscosity but also it is troublesome due to further increase in viscosity and gelation. As a dilution method, it is preferable to supply a water-base medium directly to the kneader due to easiness in taking out the slurry from the kneader. It may also be so arranged that the slurry is further dispersed by using another kneader or disperser after the kneading process to increase the uniformity of the slurry and obtain the slurry for polishing according to the present invention. In this case, Cores type high-speed mixer/disperser, homomixer, high-pressure homogenizer, thin-film whirling type high-speed mixer or beads mill can be preferably used.

In order to increase the resistance to wear and minimize metal contamination of the slurry for polishing, it is preferable that the kneader, disperser and powder supplier referred to in the above should be provided with a lining of polyurethane, Teflon, epoxy resin or the like or a ceramic lining of zirconia or the like on the liquid and powder contact portions such as the inner wall and the mixing blades.

Other Examples of Equipment Used in the Dispersion Process

In addition to the above-described planetary equipment, high-pressure homogenizer, for example, which bumps and disperses the fluid, can be used in the manufacture process for the slurry for polishing. Among the high-pressure homogenizers are Mantongaurin Homogenizer supplied from Doei Shoji Co., Ltd., Verori Homogenizer manufactured by Nihonseiki Kaisha Ltd., Microfluidizer manufactured by Mizuho Industrial Co., Ltd., Nanomizer manufactured by Tsukishima Machinery Co., Ltd., Genus PY manufactured by Hakusui Chemical Industries Co., Ltd., System Organizer supplied from Japan B.E.E. Co., Ltd., and Ultimaizer System from Itochu Sanki Co., Ltd. Among the thin-film whirling type high-speed mixers is Fill Mix manufactured by Tokushu Kika Co., Ltd. Dispersers such as Beads Mill may also be used. Among the preferable materials of beads are non-alkali glass, alumina, zircon, zirconia, titania and silicon nitride.

For the manufacture of the slurry for polishing, one type of disperser may be used or two or more types of dispersers may be used for a plurality of times. Like the planetary kneader equipment in the above, when equipment other than the planetary equipment is used in the disperse process in addition of the planetary equipment, it is preferable that such equipment should be provided with a lining of polyurethane, Teflon, epoxy resin or the like or a ceramic lining of zirconia or the like on the liquid contact portions such as the inner wall and the mixing blades to increase the resistance to wear and minimize metal contamination to the slurry for polishing.

Filtration of the Slurry for Polishing

In order to sufficiently remove coarse particles from the slurry for polishing according to the present invention, it is preferable to pass the slurry through a filter after kneading for the manufacture of the slurry for polishing. Among the filters applicable for this purpose are depth type depth cartridge filter and filter bag type filter. Among the depth cartridge filters are filters supplied from Advantech Toyo Co., Ltd. and Japan Pall Co., Ltd. Among the filter bag type filters is filter supplied from ISP Co., Ltd.

In the above description, the depth type filer means an integrated filter in which pores in the filter material are coarse on the inlet side and fine on the outlet side and steplessly and stepwisely become finer from the inlet side toward the outlet side. As the filter material of the depth type filter is sufficiently thick (e.g., 0.2 to 2 cm), the depth type filter can collect a large quantity of foreign matter from the fluid flowing through the filter material.

Figure 2:
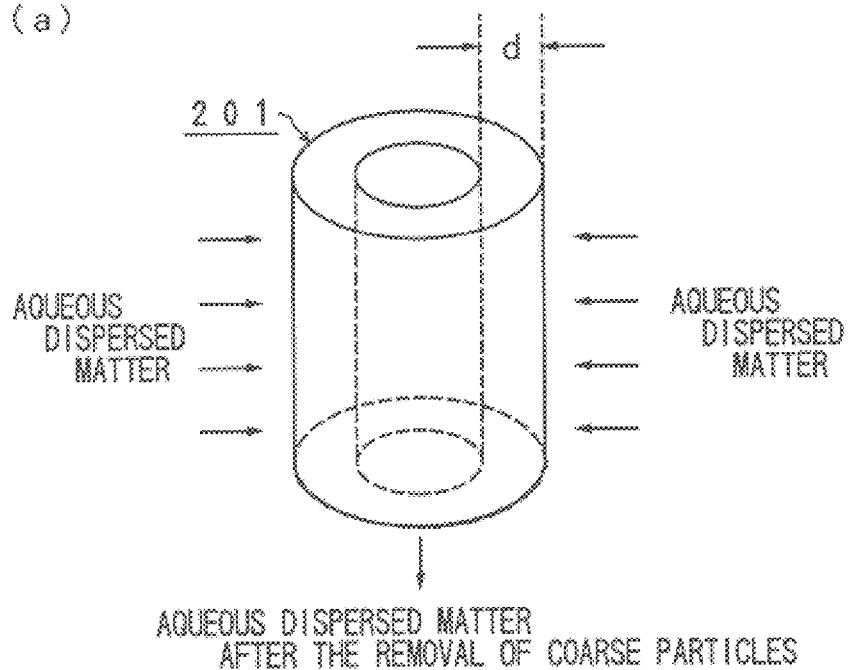
FIG. 2(a) is a perspective view schematically illustrating a depth type cartridge filter of hollow cylindrical shape.
FIG. 2(b) is a schematic illustrating pore structure in the thickness direction and fiber diameter of the depth type filter.
Figure 2:
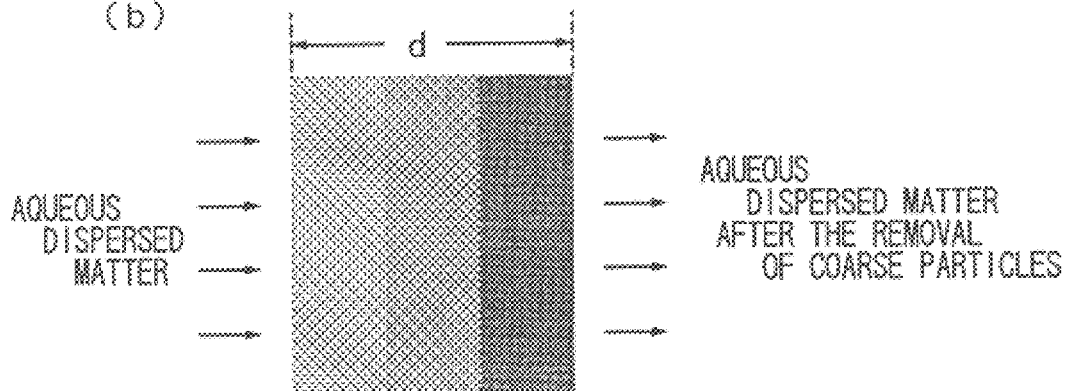
Figure 2:
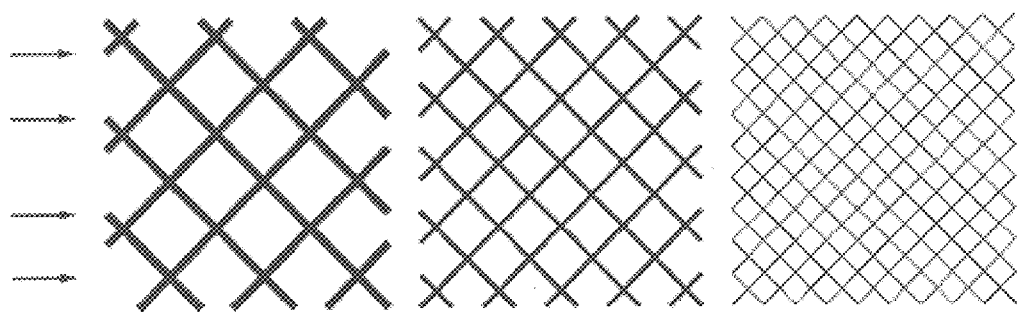

An example of the filter material of the depth type filter is shown in FIG. 2(b). As shown in this figure, the filter material is designed and integrally constructed to the width of d so that the pores are coarse on the fluid entry (inlet) side and fine on the fluid discharge (outlet) side and steplessly or stepwisely (either one step or two or more steps) become finer from the fluid entry side toward the fluid discharge side. Due to this construction, comparatively large particles among of all coarse particles can be collected near the fluid entry side and comparatively small particles among of all coarse particles can be collected near the discharge side, and as a while, coarse particles can be collected at each part of the filter in the thickness direction. As a result, there are positive effects that coarse particles can be reliably collected, the filter is not likely to be clogged with coarse particles, and therefore the filter can have a longer service life.

As shown in FIG. 2(b), it is preferable that the fibers of the filter material of the depth type filter should be thick on the fluid entry (inlet) side and thin on the fluid discharge (outlet) side so that the porosity can be almost uniform at each part of the filter material from the fluid entry side to the fluid discharge side. Here, the porosity means the area ratio of the pores at a cross section cut at right angles to the fluid passing direction [(Pores area)/{(Pores area)+(Filter material area)}]. As the porosity is almost uniform at each part of the filter material from the fluid entry side to the fluid discharge side, pressure loss during filtration is small, and the conditions of collecting coarse particle are almost uniform in the direction of the filter depth. Furthermore, a pump of comparatively low pressure may be used.

Figure 3:
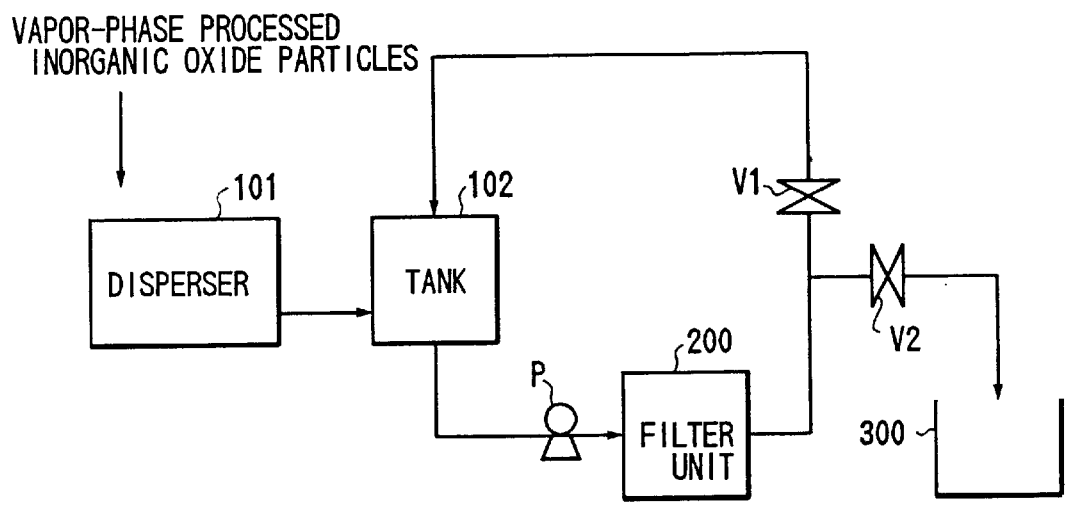
FIG. 3(a) is a construction view illustrating an example of a filtration system using the depth type filter of FIG. 2.
FIG. 3(b) is a perspective view schematically illustrating the depth type filter of bag shape.
Figure 3:
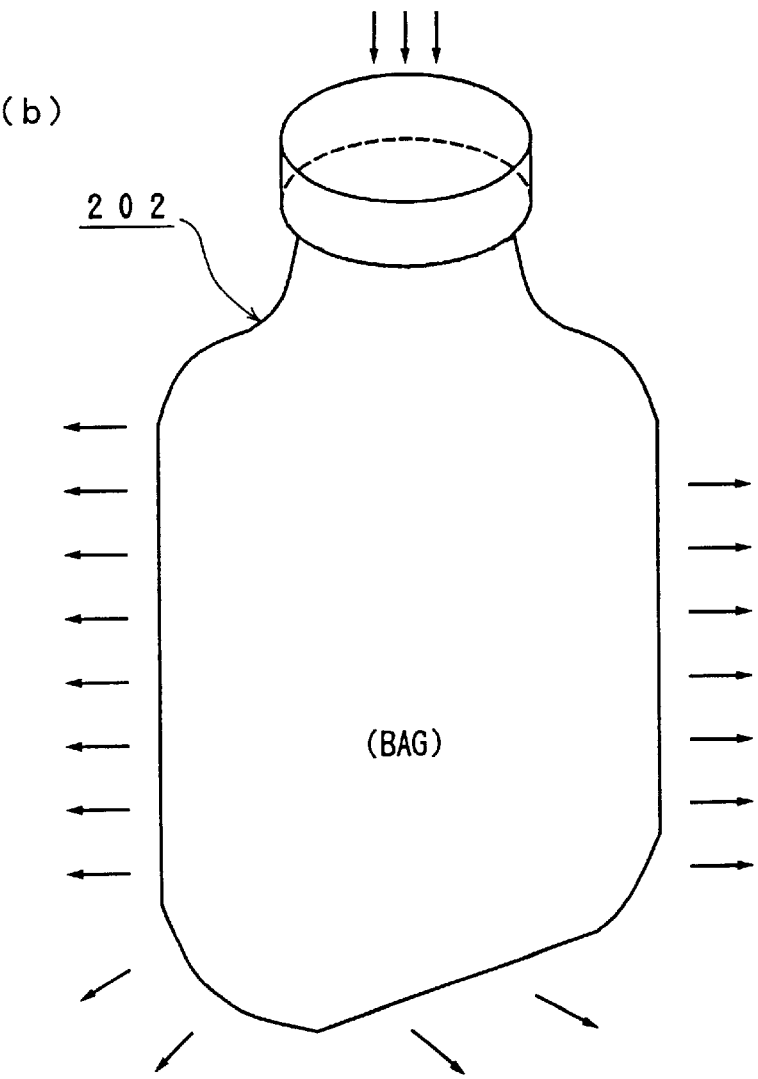

The depth type filter having the above filter material may be a hollow cylinder type cartridge type filter 201 as shown in FIG. 2(a) or a bag type filter 202 as shown in FIG. 3(b). The hollow cylinder type filter 201 is advantageous in that the thickness of the filter material can be designed to any desired thickness. On the other hand, the bag type filter 202 is advantageous in that as it is set within a filter unit 200 (FIG. 3(a)) so that the fluid can pass through the bag from the inside of the bag to the outside of the bag, collected coarse particles can be removed as they are in the filter 202 at the time of filter change.

When such depth type filter is set within the filer unit 200 as shown in FIG. 3(a), for example, coarse particles can be removed from the slurry after the knead process. The size of the particles to be removed can be controlled by properly selecting the filter pore construction.

FIG. 3(a) shows a system, in which the slurry for polishing is manufactured by adding the water-laden solid matter according to the present invention to a water-base medium within a disperser 101 and dispersing such water-laden solid matter in the water-base medium, such slurry for polishing is stored within a tank 102, then forcedly sent from the tank 102 to the filter unit 200 by using a pump P, then filtered through the filter 201 or 202 set within the filter unit 200, then returned through a valve V1 to the tank 102, and by repeating this cycle, coarse particles within the slurry for polishing are sufficiently removed, then the valve VI is closed and a valve V2 is opened, and the slurry for polishing after the coarse particle removal process is stored within a tank 300. FIG. 3(a) shows a circulation type system. However, single pass type system may be used. In case of the single pass type, the tank may be pressurized by applying air pressure or the like for filtration instead of using the pressure pump P.

In order to remove coarse particles from the slurry for polishing, centrifugal separation method may be used together. When another filter with larger pores is used in the preceding stage as a pre-filter, the depth type filter has less possibility of being clogged and a longer service life.

EXAMPLES

Now, examples of the present invention will be described.

In the following description, the water content was calculated from the loss in weight of the manufactured water-laden solid matter after being heated to 250° C. for 20 minutes, and the bulk density was calculated based on the weight and volume of the manufactured water-laden solid matter of approx. 500 g measured in a measuring cylinder of 1000 mL.

Examples of Water-laden Solid Material

Example-1

Aerosil #50 ($SiO_2$ powder manufactured by the fumed process, having bulk density of 0.05 g/cm$^3$, manufactured by Nippon Aerosil Co., Ltd.) of 4 g was put into a plastic beaker of 3 L, ion exchange water of approx. 5 g was added in spray to Aerosil #50, and the beaker was shaken for mixing.

Then, Aerosil #50 of another 4 g and ion exchange water of another approx. 5 g was added to the mixture, and the beaker was shaken for mixing. By repeating this operation, ion exchange water of approx. 50 g in total was added to Aerosil #50 of 40 g in total, and uniform water-laden particle matter was obtained.

By further repeating the above operation, uniform granular matter of 900 g was obtained.

The particle size of the obtained granular matter was within a rough range of 1 to 10 mm. The particle size was measured on more than 100 particles through optical microscopic photograph, and the measured values were averaged to obtain the average particle size of 5.5 mmϕ. The average water content of the obtained granular matter was 55%, and the bulk density thereof was 0.70 g/cm$^3$.

Example-2

Aerosil #90 ($SiO_2$ powder manufactured by the fumed process, having bulk density of 0.05 g/cm$^3$, manufactured by Nippon Aerosil Co., Ltd.) was used instead of Aerosil #50, and granular matter was obtained in the same way as EXAMPLE-1.

The particle size of the obtained granular matter was within a rough range of 1 to 10 mm. The average particle size thereof obtained in the same way as EXAMPLE-1 was 6.2 mmϕ. The average water content thereof was 55%, and the bulk density thereof was 0.72 g/cm$^3$.

Example-3

Aerosil #200 ($SiO_2$ powder manufactured by the fumed process, having bulk density of 0.05 g/cm$^3$, manufactured by Nippon Aerosil Co., Ltd.) was used instead of Aerosil #50, and excepting this, granular matter was obtained in the same way as EXAMPLE-1.

The particle size of the obtained granular matter was within a rough range of 1 to 10 mm. The average particle size thereof obtained in the same way as EXAMPLE-1 was 6.4 mmϕ. The average water content thereof was 55%, and the bulk density thereof was 0.68 g/cm$^3$.

Example-4

Aluminum oxide ($Al_2O_3$ powder manufactured by the fumed process, having bulk density of 0.05 g/cm$^{31}$, manufactured by Nippon Aerosil Co., Ltd.) was used instead of Aerosil #50, and excepting this, granular matter was obtained in the same way as EXAMPLE-1.

The particle size of the obtained granular matter was within a rough range of 1 to 10 mm. The average particle size thereof obtained in the same way as EXAMPLE-1 was 3.8 mmϕ. The average water content thereof was 55%, and the bulk density thereof was 0.71 g/cm$^3$.

Example-5

Nano-Tek (TiO$_2$ powder manufactured by the metal evaporation and oxidation process, having bulk density of 0.26 g/cm$^3$, manufactured by C. I. Kasei Co., Ltd.) was used instead of Aerosil #50, and excepting this, granular matter was obtained in the same way as EXAMPLE1.

The particle size of the obtained particle matter was within a rough range of 1 to 10 mm. The average particle size thereof obtained in the same way as EXAMPLE-1 was 6.5 mmϕ. The average water content thereof was 55%, and the bulk density thereof was 0.71 g/cm$^3$.

Example-6

Aerosil #50 of 40 g was put into a plastic container of 20 L equipped with a Labo Mixer (a Model Mazera Z-2100, manufactured by Tokyo Rika Kikai Co., Ltd.), and ion exchange water of approx. 50 g was added in spray to Aerosil #50 while being slowly mixed.

Then, when granular mater was formed, Aerosil #50 of another 40 g was put into the plastic container while being mixed, and ion exchange water of approx. 50 g was added to the mixture in spray while being slowly mixed.

By repeating the above operation, granular matter composed of Aerosil #50 of 400 g in total and ion exchange water of approx. 500 g in total was obtained.

The particle size of the obtained granular matter was within a rough range of 1 to 12 mm. The average particle size thereof obtained in the same way as EXAMPLE-1 was 7.2 mmϕ. The average water content thereof was 55%, and the bulk density thereof was 0.71 g/cm$^3$.

Example-7

Water-laden granular matter was obtained by using Marumerizer, a rolling granulator manufactured by Fuji Paudal Co., Ltd.

To be specific, while rotating a rotary disk 51 (FIG. 4(a)), Aerosil #50 was added for approx. 50 g each time and ion exchange water was added in spray for approx. 40 g each time, and water-laden granular matter composed of Aerosil #50 of approx. 1000 g in total and ion exchange water of approx. 800 g in total was obtained.

The particle size of the obtained granular matter was within a rough range of 1 to 10 mm. The average particle size thereof obtained in the same way as EXAMPLE-1 was 7.5 mmϕ. The average water content thereof was 45%, and the bulk density thereof was 0.76 g/cm$^3$.

Examples of the Slurry for Polishing

Example-8

By repeating the operation of EXAMPLE-6, water-laden granular matter of approx. 2000 g was manufactured.

The particle size of the obtained granular matter was within a rough range of 1 to 12 mm. The average particle size thereof obtained in the same way as EXAMPLE-1 was 7.2 mmϕ. The average water content thereof was 55%, and the bulk density thereof was 0.71 g/cm$^3$.

The obtained water-laden solid matter of 1800 g was continuously added into a planetary kneader (TK Hibis Disper Mix Model 3D-5, manufactured by Tokushu Kika Co., Ltd.) for 8 minutes while being kneaded by the twist blades (11a and 11b in FIG. 1) driven by the main spindle (c in FIG. 1) in rotation at 30 rpm and the sub-spindles (a and b in FIG. 1) in rotation at 90 rpm.

After this addition, the water-laden solid matter was subjected to kneading for another 60 minutes by the twist blades 11a and 11b driven by the sub-spindles in rotation at 90 rpm and at the same time to disper processing by rotating the sub-spindles of the Cores type high-speed rotary blades of 50 mmϕ in diameter at 5000 rpm, both while rotating the respective main spindle c at 30 rpm. Here, the Cores type high-speed rotary blades (not illustrated in FIG. 1) refer to comparatively small-sized (50 mmϕ in this example as described in the above) rotary blades for shearing, which are coaxially or hetero-axially provided below the twist blades 11a and 11b, and driven by sub-spindles (not illustrated) which are made to rotate independently of the sub-spindles a and b of the twist blades 11a and 11b, respectively. Here, the disper processing refers to processing for unifying the size of the flocculated matter ranging from several μm to tens of μm to under 1 μm.

Then, the aqueous solution of 20 wt % potassium hydroxide of 81 g was added to the water-laden solid matter, and the water-laden solid matter was subjected to kneading for another 60 minutes by the twist blades 11a and 11b driven by the sub-spindles in rotation at 90 rpm and at the same time to disper processing by rotating the sub-spindles of the Cores type high-speed rotary blades described in the above at 5000 rpm, both while rotating the respective main spindle c at 30 rpm.

The slurry obtained by the above operation was diluted with ion exchange water, and the aqueous dispersed matter of silicon oxide of 30 wt % in concentration was obtained.

By filtering the obtained aqueous dispersed matter through Depth Cartridge Filter (MCY1001Y050H13, manufactured by Japan Poll Co., Ltd.) of 5 μm in pore size, coarse particles were removed therefrom.

The average particle size of particles in the obtained slurry of silicon oxide based on volume was 0.20 μm and the pH thereof was 10.6. The aqueous dispersed matter (=the slurry) of silicon oxide was tested for polishing on Lapmaster LM-15 (polishing machine of 380 mm in surface plate diameter, manufactured by Lapmaster SFT Corp.) with Pad IC1000 manufactured by Rodel Nitta Co., Ltd. stuck over the surface plate of the polishing machine and a silicon wafer set on the pad.

As polishing conditions, the pressure was 233 g/cm$^2$, the rotational speed of the surface plate was 60 rpm, the rotational speed of the head was 60 rpm, the concentration of the silicon oxide of the slurry was 10 wt %, and the supply rate of the slurry was 50 g/cm$^2$.

As a result, there was no scratch recognized. The polishing speed was 400 Å/min. This speed was equivalent to the speed applied to the slurry manufactured from Aerosil #50 in the state of powder by using the above equipment. When the water-laden solid matter was used, there was no dust produced while the water-laden solid matter was being supplied into the kneader.

PARTS LIST

10—Kneading bath of planetary kneader
a—Sub-spindle
11a—Mixing blade
b—Sub-spindle
11b—Mixing blade
c—Main spindle
51—Cylinder
52—Rotary disk

We claim:

1. Grains of water-laden solid matter produced by a method consisting essentially of adding 40 to 300 weight parts of water to 100 weight parts of inorganic oxide powder, the grains having an average size within a range of 0.5 to 100 mm in diameter, wherein said inorganic oxide powder is synthesized by either fumed process or Nano-phase Technology's process.

2. Grains of water-laden solid matter as claimed in claim 1, wherein the grains have a bulk density within a range of 0.3 to 3 g/cm$^3$.

3. A method of manufacturing a slurry for use in polishing a semiconductor device, the method comprising the steps of preparing the grains of water-laden solid matter of claim 1; and then
dispersing the grains in water to produce aqueous slurry of inorganic oxide particles, an average size of the particles being within a range of 0.05 to 1.0 $\mu$m.

4. A method of polishing a semiconductor device comprising polishing said semiconductor with the slurry manufactured according to claim 3.

5. A method for preparing grains of water-laden solid matter of claim 1, consisting essentially of adding 40 to 300 weight parts of water to 100 weight parts of said inorganic oxide powder.

* * * * *